(12) United States Patent
Seki et al.

(10) Patent No.: US 11,056,745 B2
(45) Date of Patent: Jul. 6, 2021

(54) BATTERY MODULE

(71) Applicant: HONDA MOTOR CO., LTD., Tokyo (JP)

(72) Inventors: Hidemi Seki, Saitama (JP); Atsushi Hayashida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 16/211,625

(22) Filed: Dec. 6, 2018

(65) Prior Publication Data

US 2019/0181404 A1 Jun. 13, 2019

(30) Foreign Application Priority Data

Dec. 11, 2017 (JP) .............................. JP2017-237065

(51) Int. Cl.
*H01M 50/20* (2021.01)
*H01M 10/647* (2014.01)
(Continued)

(52) U.S. Cl.
CPC ......... *H01M 50/20* (2021.01); *H01M 10/613* (2015.04); *H01M 10/647* (2015.04);
(Continued)

(58) Field of Classification Search
CPC .................................................. H01M 2/1077
See application file for complete search history.

(56) References Cited

U.S. PATENT DOCUMENTS

2012/0064386 A1 3/2012 Oguri et al.
2012/0080254 A1 4/2012 Tsukamoto et al.
(Continued)

FOREIGN PATENT DOCUMENTS

CN 101728572 A 6/2010
CN 102055003 A 5/2011
(Continued)

OTHER PUBLICATIONS

Jul. 9, 2019, Japanese Office Action issued for related JP Application No. 2017-237065.
(Continued)

*Primary Examiner* — Milton I Cano
*Assistant Examiner* — Jenna Shulman
(74) *Attorney, Agent, or Firm* — Paratus Law Group, PLLC (57) ABSTRACT

There is provided a battery module capable of restraining an increase in manufacturing costs and reducing a height dimension of the battery module. The battery module includes a cell-stacked body in which a plurality of battery cells are stacked, and a module case for holding the cell-stacked body. The module case includes a pair of side plates for holding side surfaces of the cell-stacked body, a bottom plate on which the cell-stacked body is loaded, and a plate member installed on an upper end portion of the pair of side plates to cover at least a part of an upper surface of the cell-stacked body. A filler is filled in a first space formed between the plate member and the upper surface of the cell-stacked body and in a second space formed between the side plate and the side surface of the cell-stacked body.

6 Claims, 6 Drawing Sheets

(51) Int. Cl.
  *H01M 10/6554* (2014.01)
  *H01M 10/613* (2014.01)
  *H01M 10/6567* (2014.01)
  *H01M 10/6557* (2014.01)
  *H01M 50/24* (2021.01)
  *H01M 50/502* (2021.01)

(52) U.S. Cl.
  CPC ... *H01M 10/6554* (2015.04); *H01M 10/6557* (2015.04); *H01M 10/6567* (2015.04); *H01M 50/24* (2021.01); *H01M 50/502* (2021.01); *H01M 2220/20* (2013.01)

(56) References Cited

U.S. PATENT DOCUMENTS

| | | | |
|---|---|---|---|
| 2012/0121949 A1 | 5/2012 | Eberhard et al. | |
| 2013/0004822 A1* | 1/2013 | Hashimoto | H01M 10/613 |
| | | | 429/120 |
| 2015/0140408 A1 | 5/2015 | Hayashida et al. | |
| 2016/0036102 A1 | 2/2016 | Suzuki et al. | |
| 2016/0260946 A1 | 9/2016 | Ochi et al. | |
| 2017/0301905 A1 | 10/2017 | Takeda et al. | |

FOREIGN PATENT DOCUMENTS

| | | |
|---|---|---|
| CN | 102403480 A | 4/2012 |
| CN | 102442378 A | 5/2012 |
| CN | 102593389 A | 7/2012 |
| CN | 104303334 A | 1/2015 |
| CN | 104364931 A | 2/2015 |
| CN | 104466052 A | 3/2015 |
| CN | 105359330 A | 2/2016 |
| CN | 105794017 A | 7/2016 |
| CN | 106716675 A | 5/2017 |
| CN | 107134557 A | 9/2017 |
| EP | 2290728 A1 | 3/2011 |
| EP | 2999026 A1 | 3/2016 |
| JP | 2011-049012 A | 3/2011 |
| JP | 2012-204038 A | 10/2012 |
| JP | 2012-256466 A | 12/2012 |
| JP | 2013-012441 A | 1/2013 |

OTHER PUBLICATIONS

May 7, 2021, Chinese Office Action issued for related CN Application No. 201811507402.5.

* cited by examiner

BATTERY MODULE

CROSS-REFERENCE TO RELATED APPLICATIONS

This application is based on and claims priority under 35 USC 119 from Japanese Patent Application No. 2017-237065 filed on Dec. 11, 2017, the contents of which are incorporated herein by reference.

TECHNICAL FIELD

The present disclosure relates to a battery module mounted in an electric vehicle, for example.

BACKGROUND ART

In the related art, a battery module has been mounted in an electric vehicle. For example, Patent Literature 1 (Japanese Laid-Open Patent Publication No. 2012-256466) discloses a battery module including a cell-stacked body in which a plurality of battery cells are stacked, and a module case holding the cell-stacked body. The module case disclosed in Patent Literature 1 includes a pair of end plates arranged at opposite end portions of the cell-stacked body in a cell stacking direction, and a pair of side plates connecting the pair of end plates. In addition, a location of the cell-stacked body in the cell stacking direction is positioned between the pair of end plates, and a location of the cell-stacked body in the cell width direction is positioned between the pair of side plates. Thus, a location of the cell-stacked body in a cell height direction is positioned between an upper flange and a lower flange of the pair of side plates.

However, since the above kind of battery module includes a gap between the cell-stacked body and the side plates in consideration of an assembling property, there is a limitation in restraining the cell-stacked body in a cell width direction.

As disclosed in Patent Literature 1, according to the battery module that restrains a movement of the cell-stacked body in a cell height direction by providing a spring member between the cell-stacked body and a lower flange (or upper flange) of the side plate, manufacturing costs of the battery module increase and a dimension in a height direction of the battery module increases.

The present disclosure provides a battery module capable of restraining an increase in manufacturing costs and reducing a height dimension of the battery module.

SUMMARY OF INVENTION

The present disclosure provides a battery module including:
  a cell-stacked body in which a plurality of battery cells are stacked; and
  a module case for holding the cell-stacked body, wherein the module case includes
    a pair of side plates for holding side surfaces of the cell-stacked body,
    a bottom plate on which the cell-stacked body is loaded, and
    a plate member installed on an upper end portion of the side plate to at least partially cover an upper surface of the cell-stacked body, and
    a filler is filled in a first space formed between the plate member and the upper surface of the cell-stacked body and in a second space formed between the side plate and the side surface of the cell-stacked body.

According to the present disclosure, since a plate member covers at least a part of a surface of a cell-stacked body and a filler is filled in a first space that is a gap between the plate member and an upper surface of the cell-stacked body and a second space that is a gap between a side plate and a side surface of the cell-stacked body, movement of the cell-stacked body in a cell width direction and a cell height direction may be restrained. Also, the filler, not a spring member, is used to perform a fixing operation, and thus, increase in manufacturing costs may be prevented and a height dimension of the battery module may be reduced.

BRIEF DESCRIPTION OF THE DRAWINGS

Exemplary embodiment of the present disclosure will be described in detail based on the following figures, wherein.

DESCRIPTION OF EMBODIMENTS

Hereinafter, a battery module according to each of embodiments of the present disclosure will be described with reference to accompanying drawings. In addition, in the present specification, for convenience and clarity of description, a cell stacking direction is defined as a front-back direction, a cell width direction perpendicular to the cell stacking direction is defined as a left-right direction, and a cell height direction perpendicular to the cell stacking direction is defined as an up-down direction. However, the above directions are irrelevant with a front-back direction, etc. of a product in which the battery module is mounted. That is, when the battery module is mounted in a vehicle, the cell stacking direction may be in a front-back direction of the vehicle, an up-down direction, or a left-right direction of the vehicle. Otherwise, the cell stacking direction may be a direction inclined with respect to the above directions. A front portion of the battery module shown in the drawings is indicated by Fr, a rear portion is indicated by Rr, a left portion is indicated by L, a right portion is indicated by R, an upper portion is indicated by U, and a lower portion is indicated by D.

First Embodiment

First, a battery module 1 according to a first embodiment of the present disclosure will be described with reference to FIGS. 1 to 5.

<Battery Module>

Figure 1:
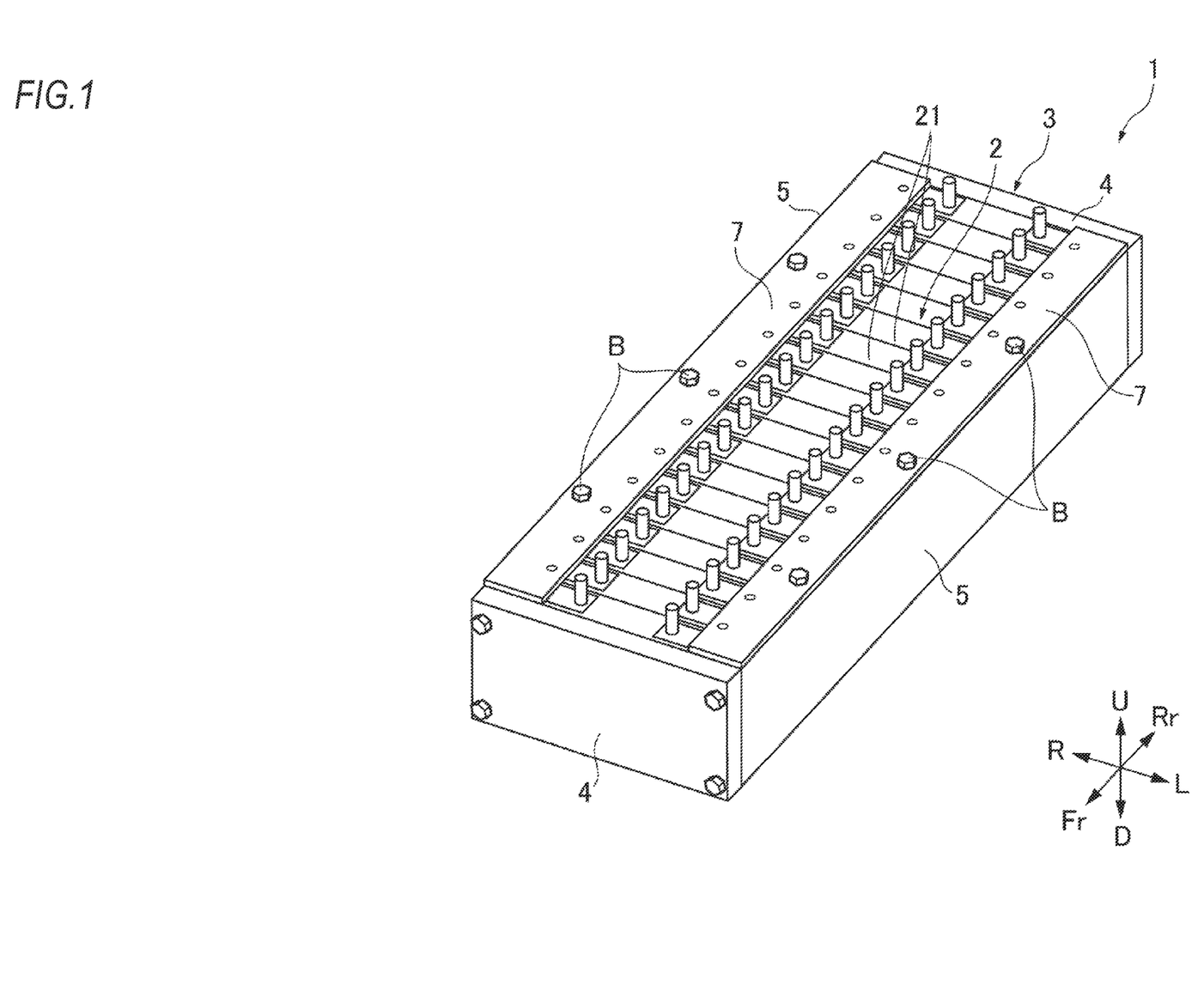
FIG. 1 is a schematic perspective view of a module unit according to a first embodiment.
Figure 2:
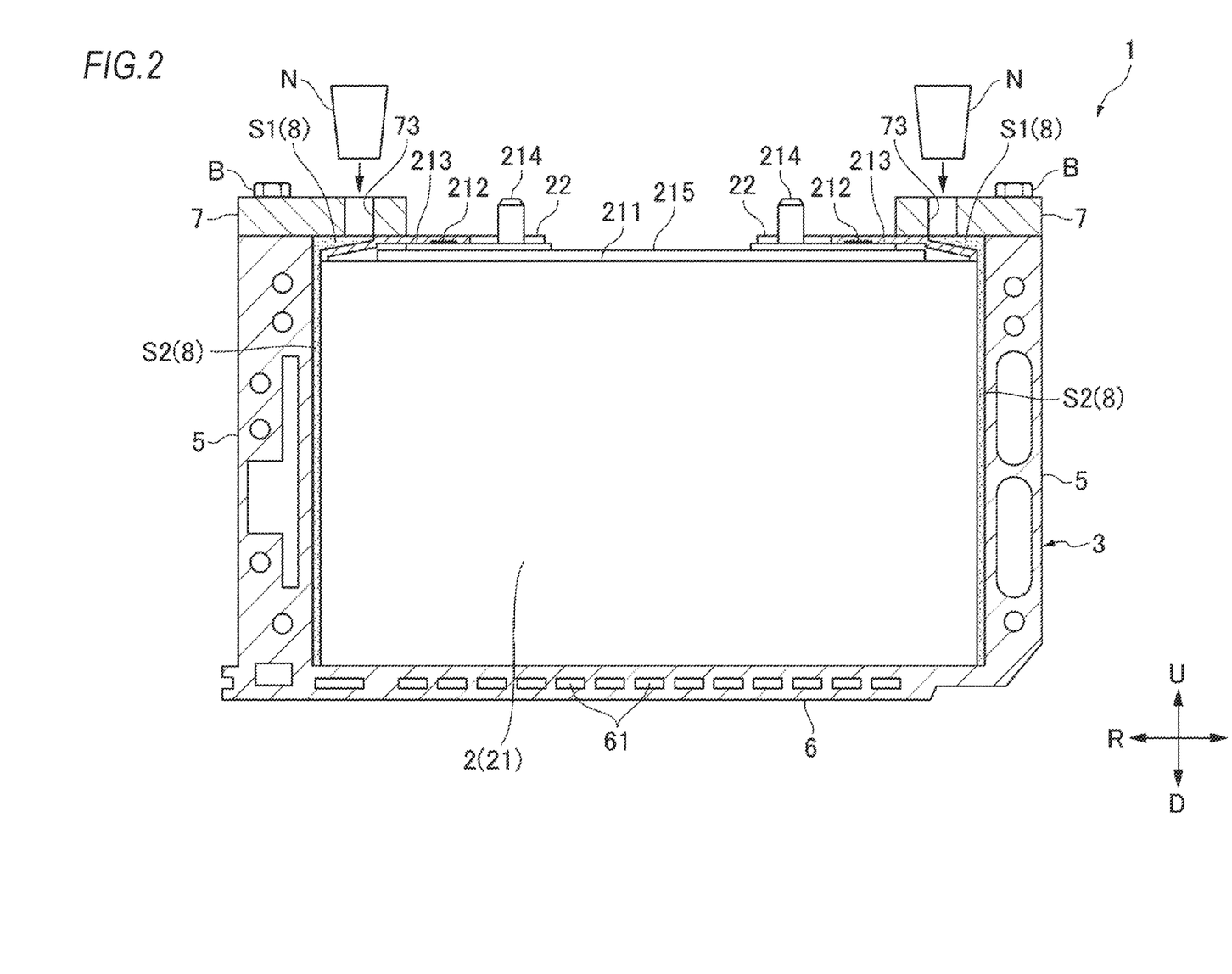
FIG. 2 is a cross-sectional view of the module unit of FIG. 1.

As shown in FIGS. 1 and 2, the battery module 1 includes a cell-stacked body 2 in which a plurality of cells 21 are stacked, and a module case 3 holding the cell-stacked body 2. The module case 3 includes a pair of end plates 4 holding a front surface and a rear surface of the cell-stacked body 2, at least a pair of side plates 5 holding side surfaces of the cell-stacked body 2, a bottom plate 6 on which the cell-stacked body 2 is loaded, and a pair of plate members 7 provided on upper end portions of the side plates 5 to cover at least a part of a surface of the cell-stacked body 2.

(Cell-Stacked Body)

The cell-stacked body 2 is configured by stacking the cells 21 in a front-back direction. Each cell of the plurality of cells 21 includes a storage element (not shown), a cell case 211 accommodating the storage element, a pair of internal terminals 212 protruding from an upper surface of the respective cell that is connected to a positive electrode or a negative electrode of the storage element, a pair of external terminals 214 electrically connected to the internal terminals 212 via connection members 213 arranged on the upper surface of the respective cell, and a terminal insulation plate 215 arranged along the upper surface of the respective cell to insulate the connection members 213 and the external terminals 214 from the cell case 211.

On an upper surface of the cell-stacked body 2, a plurality of bus bars 22 electrically connected to the external terminals 214 of the plurality of cells 21 are arranged. The plurality of bus bars 22 connect the external terminals 214 of adjacent cells of the plurality of cells 21 to each other, so that the plurality of cells 21 are electrically connected to one another in series. In detail, the cells 21 are stacked so that the external terminals 214 of a positive side and the external terminals 214 of a negative side are sequentially and laterally inverted. The plurality of bus bars 22 connect the respective external terminal of the positive side to the respective external terminal of the negative side of adjacent cells of the plurality of cells 21 on a side of the cell stacking direction, and connect the respective external terminal of the positive side to the respective external terminal of the negative side of the adjacent cells of the plurality of cells 21 on an opposite side of the cell stacking direction, and then, the above operations are sequentially repeated to electrically connect the plurality of cells 21 to one another in series.

Figure 4:
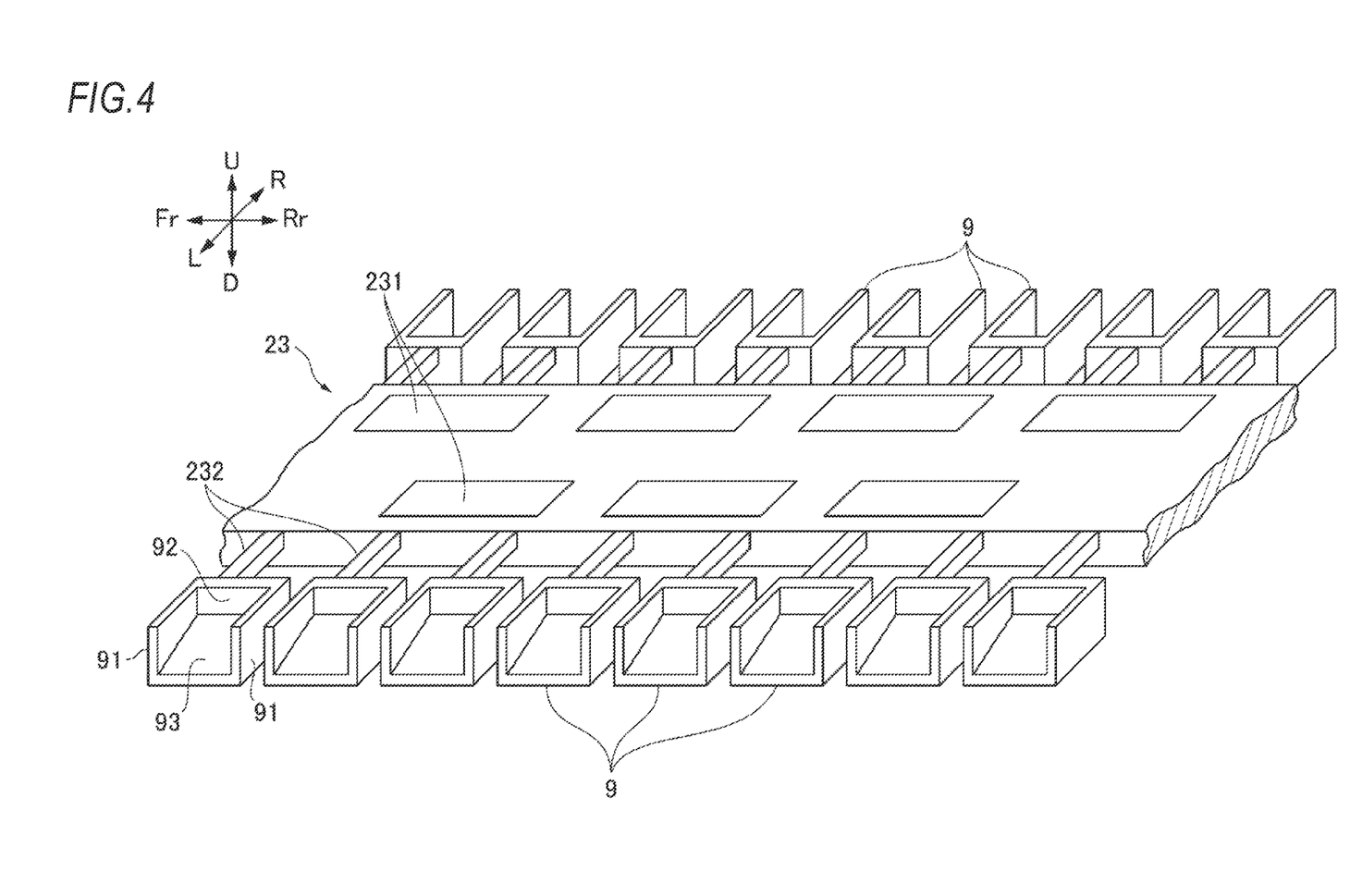
FIG. 4 is a partially perspective view of a bus bar plate.

A bus bar plate 23 holding the plurality of bus bars 22 is installed on the upper surface of the cell-stacked body 2. As shown in FIG. 4, the bus bar plate 23 includes a plurality of bus bar holders 231. When the bus bar plate 23 is placed on the upper surface of the cell-stacked body 2 after holding the plurality of bus bars 22 by using the bus bar holders 231, the plurality of bus bars 22 are positioned at predetermined locations connectable to the corresponding external terminals 214. Also, the bus bar plate 23 is not a jig that is detached after connecting the bus bars 22 to the external terminals 214, but an element of the battery module 1, which maintains a mounted state thereof even after connecting the bus bars 22 to the external terminals 214.

(End Plates)

The pair of end plates 4 are arranged along the front surface and the rear surface of the cell-stacked body 2, and receive a load of the cell-stacked body 2 in the cell stacking direction. The load of the cell-stacked body 2 in the cell stacking direction is caused by expansion of the cells 21 due to a temperature variation or aged deterioration of the cell-stacked body 2, as well as an external impact.

(Side Plates)

The pair of side plates 5 are connected via the bottom plate 6 along a left side or a right side of the cell-stacked body 2, thereby holding side surfaces of the cell-stacked body 2. Also, in the present embodiment, the side plates 5 and the bottom plate 6 are integrally formed, but the side plates 5 and the bottom plate 6 may be provided as separate members.

Figure 3:
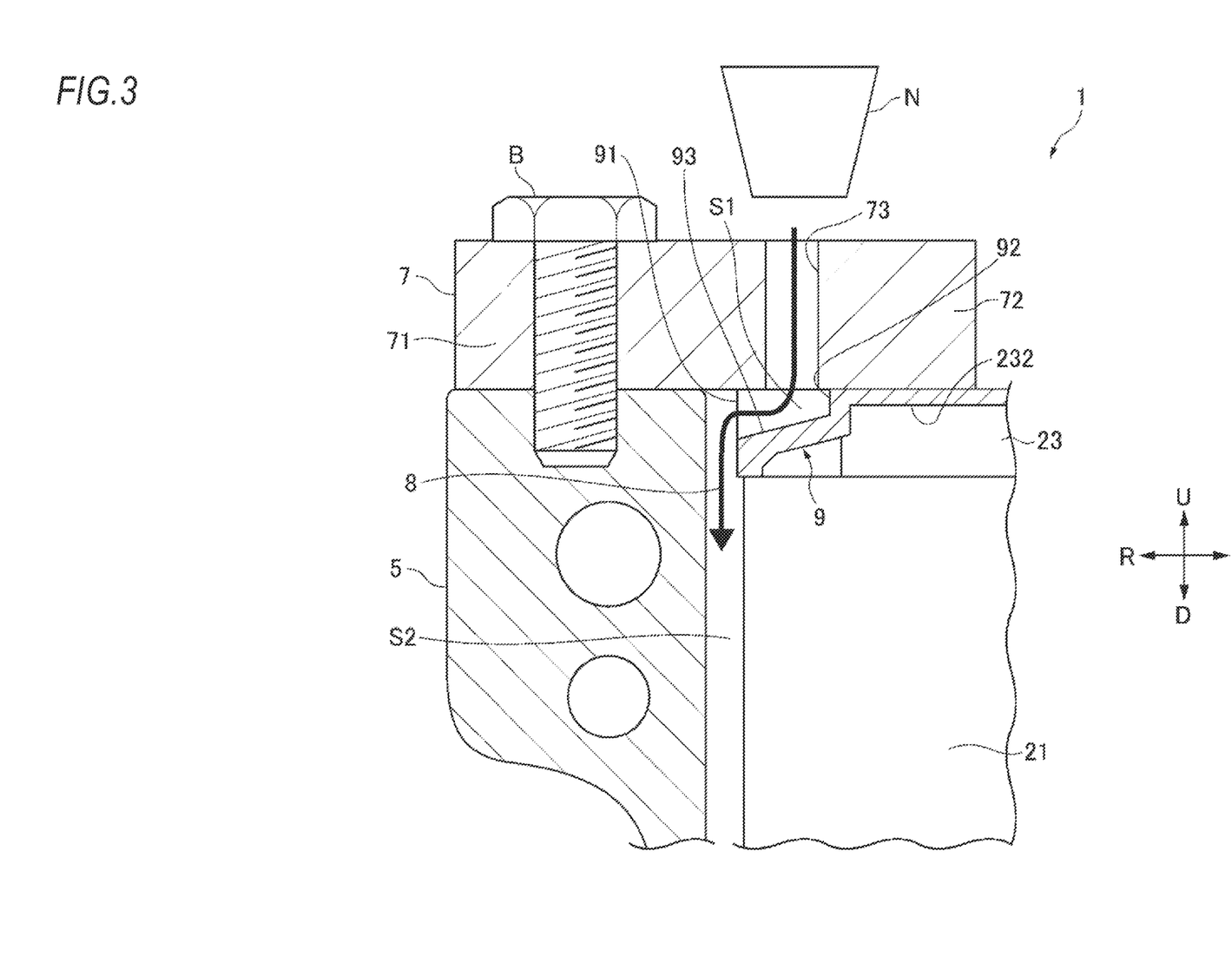
FIG. 3 is an enlarged cross-sectional view of a main configuration of FIG. 2.

As shown in FIGS. 2 and 3, a gap S2 (second space) is ensured between each side plate 5 and a side surface of the cell-stacked body 2. The gap S2 is provided in consideration of an assembling property when the cell-stacked body 2 is assembled from an upper portion in between the pair of side plates 5, and has a lateral width that is widened from a lower portion towards an upper portion thereof.

The side plate 5 is formed of an aluminum extruded material (aluminum alloy material), and is arranged adjacent to a left side surface or a right side surface of the cell-stacked body 2 to function as a heat dissipation member by transferring and dissipating heat from the cell-stacked body 2.

(Bottom Plate)

As shown in FIG. 2, the bottom plate 6 holds a lower surface of the cell-stacked body 2. The bottom plate 6 is formed of an aluminum extruded material (aluminum alloy material), and is in close contact with the lower surface of the cell-stacked body 2 to function as a heat dissipation member for transferring and dissipating the heat from the cell-stacked body 2. Also, the bottom plate 6 includes a plurality of water jackets 61 constituting a cooling mechanism, so that cooling water flows through the water jackets 61 to control a temperature of the cell-stacked body 2.

(Plate Member)

Figure 5:
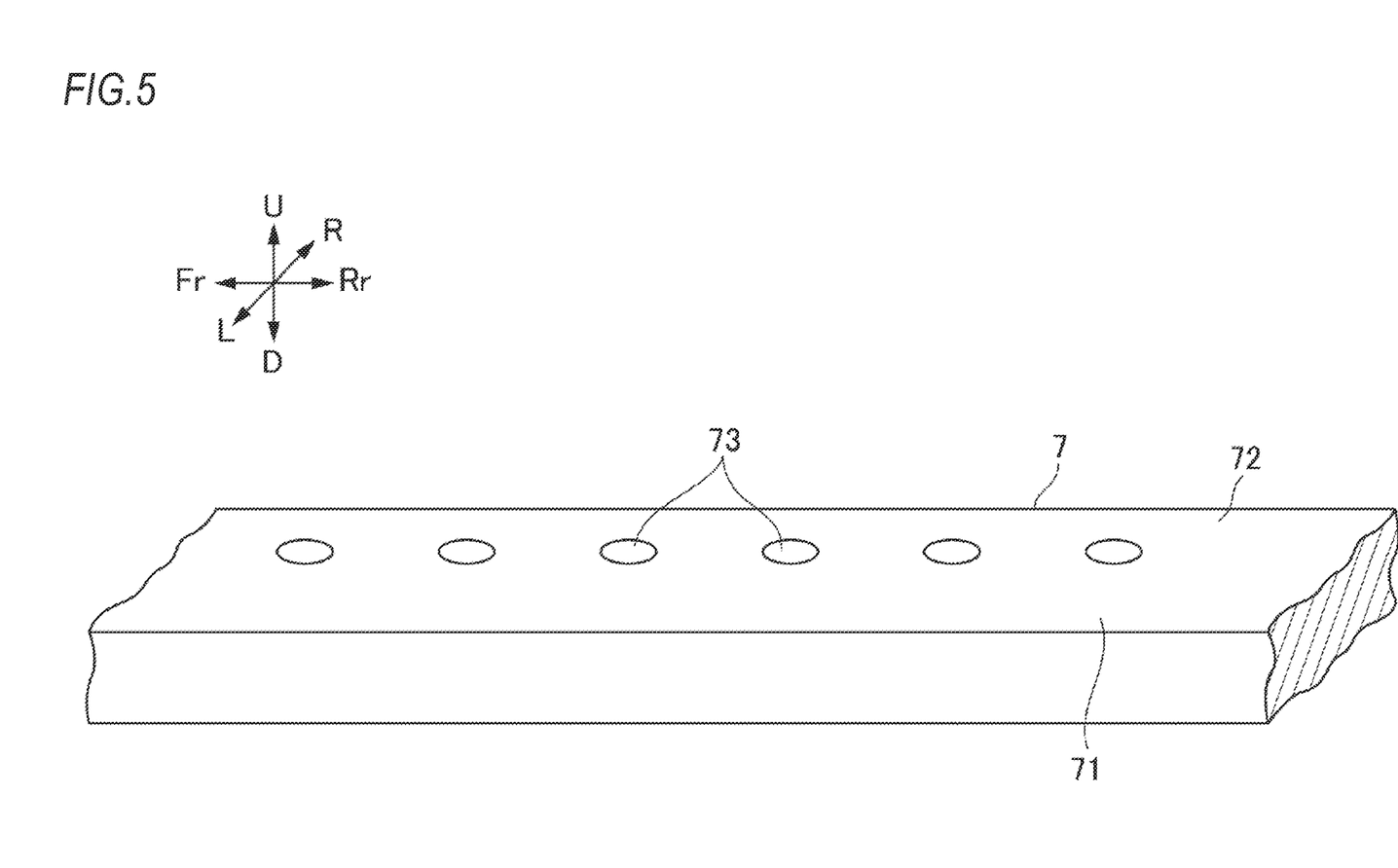
FIG. 5 is a partially perspective view of a plate member.

As shown in FIGS. 2 and 3, the plate members 7 are arranged along upper end surfaces of the side plates 5, and at the same time, are coupled to the side plates 5 via a plurality of bolts B. Each of the plate members 7, as shown in FIG. 5, includes a coupling portion 71 coupled to the upper end surface of the side plate 5, and an extension portion 72 extending from the coupling portion 71 above the upper surface of the cell-stacked body 2 to cover an edge of the upper surface (corner) of the cell-stacked body 2. In addition, a gap S1 (first space) is ensured between the extension portion 72 and the upper surface of the cell-stacked body 2. Also, the extension portion 72 includes a plurality of injection holes 73 penetrating therethrough in an up-down direction with predetermined intervals therebetween in the front-back direction. The injection holes 73, as shown in FIGS. 2 and 3, are formed at positions overlapping with the upper surface of the cell-stacked body 2 in the left-right direction to communicate with the gap S1.

The gap S1 and the gap S2 are filled with a filler 8. The filler 8 is filled in the gap S1 through the injection hole 73 from a filling nozzle N, and at the same time, is filled in the gap S2 through the gap S1. Any kind of material may be used as the filler 8, provided that the material has fluidity during the filling and may be cured after the filling operation.

According to the above battery module 1, since the filler 8 is filled in the gap S1 between the plate member 7 and the upper surface of the cell-stacked body 2 and the gap S2 between the side plate 5 and the side surface of the cell-stacked body 2, movement of the cell-stacked body 2 in the cell width direction and the cell height direction may be restrained.

Further, the filler 8, not a spring member, is used to perform a fixing operation, and thus, increase in manufacturing costs may be prevented and a height dimension of the battery module 1 may be reduced. Also, the filler 8 may be injected after fixing the plate member 7, which makes the assembly of the battery module 1 easy. Also, since the side surfaces and a part of the upper surface of the cell-stacked body 2 are in close contact with the module case 3 having the cooling mechanism via the filler 8, cooling efficiency of the cell-stacked body 2 may be improved.

In addition, since the injection holes 73 are arranged at the positions overlapping with the upper surface of the cell-stacked body 2, filling of the filler 8 into the gap S1 may be performed easily. In addition, since the gap S2 has a greater lateral width at the upper portion thereof, inflow of the filler 8 may be allowed definitely and the filler 8 may be filled appropriately.

(Guide Passage Member)

The battery module 1 includes, as shown in FIG. 3, a guide passage member 9 which is provided between the plate member 7 and the upper surface of the cell-stacked body 2 to guide the filler 8 injected from the injection hole 73 to the gap S2 in an obliquely downward direction. The guide passage member 9 includes a pair of partition walls 91 for restricting outflow of the filler 8 injected through the injection hole 73 in the front-back direction, a second partition wall 92 for restricting outflow of the filler 8 injected through the injection hole 73 towards the respective external terminal, and an inclined guide 93 for guiding the filler 8 injected through the injection hole 73 obliquely downward to the gap S2. In addition, the guide passage member 9 is provided at a location corresponding to each injection hole 73. According to the guide passage member 9 as above, the filling of the filler 8 in the gap S2 may be performed easily and reliably, and moreover, outflow of the filler 8 to unnecessary parts may be restrained.

The guide passage member 9 according to the present embodiment is provided as a part of the bus bar plate 23 as shown in FIG. 4. The guide passage members 9 arranged at opposite ends of left and right sides on the upper surface of each cell of the plurality of cells 21 are connected to the bus bar plate 23 respectively via connection portions 232. According to the battery module 1 as above, the bus bar plate 23 for holding the plurality of bus bars 22 also functions as the guide passage member 9, and thus, the number of components may be reduced.

The guide passage member 9 is preferably movable in the up-down direction (namely, vertically) relative to the plate member 7. For example, the connection portion 232 may be elastically deformed or rotated to allow the guide passage member 9 to move in the up-down direction relative to the plate member 7. According to the battery module 1 as above, since the guide passage member 9 may be moved in the up-down direction with respect to the plate member 7, the height variation among the cells 21 may be absorbed.

Second Embodiment

Figure 6:
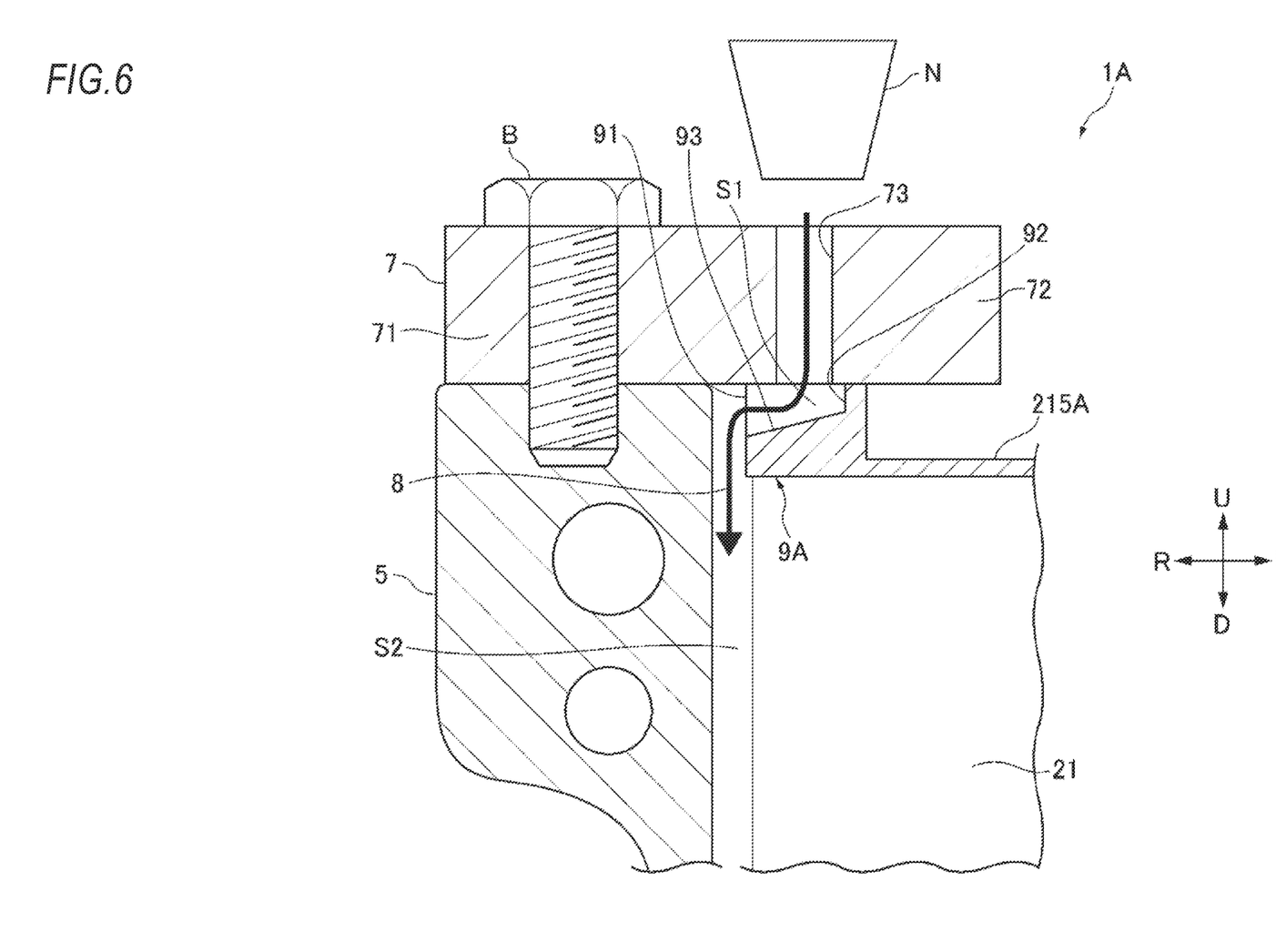
FIG. 6 is an enlarged cross-sectional view of a main configuration of a battery module according to a second embodiment.

Next, a battery module 1A according to a second embodiment of the present disclosure will be described with reference to FIG. 6. In the descriptions below, like reference numerals denote the same elements as those of the battery module 1 according to the first embodiment, and descriptions thereof are omitted or briefly provided. In the battery module 1 according to the first embodiment, the guide passage member 9 is formed as a part of the bus bar plate 23, whereas a guide passage member 9A is provided as a part of a terminal insulation plate 215A in the battery module 1A according to the second embodiment.

The terminal insulation plate 215A is a member arranged along the upper surface of each cell of the plurality of cells 21, for insulating the external terminals 214 of the respective cell from the cell case 211. According to the present embodiment, the guide passage member 9A is formed at left and right ends of the terminal insulation plate 215A integrally with the terminal insulation plate 215A. According to the battery module 1A as described above, the terminal insulation plate 215A for insulating the external terminals 214 of the respective cell from the cell case 211 also functions as the guide passage member 9A, and thus, the number of components may be reduced.

In addition, the above-described embodiments may be appropriately transformed, modified, and so on. For example, in the above embodiments, the guide passage members 9 and 9A are arranged at the left and right ends on the upper surface of each cell of the plurality of cells 21, and the injection holes 73 are formed in the plate member 7 to be located above the guide passage members 9 and 9A. However, the number of the guide passage members 9 and 9A and the number of the injection holes 73 may be appropriately changed. In addition, in the above embodiments, the guide passage members 9 and 9A are formed as a part of the bus bar plate 23 or the terminal insulation plate 215A respectively, but the guide passage members 9 and 9A may be provided as separate members from the bus bar plate 23 and the terminal insulation plate 215A.

At least following is described in the present specification. Also, the corresponding elements and the like in the above-described embodiments are indicated in parentheses, but the present disclosure is not limited thereto.

(1) A battery module (battery module 1) including:

a cell-stacked body (a cell-stacked body 2) in which a plurality of battery cells (cells 21) are stacked; and a module case (a module case 3) for holding the cell-stacked body, wherein the module case includes a pair of side plates (side plates 5) for holding side surfaces of the cell-stacked body, a bottom plate (a bottom plate 6) on which the cell-stacked body is loaded, and a plate member (a plate member 7) provided on an upper end portion of the side plate to cover at least a part of an upper surface of the cell-stacked body, and a filler (a filler 8) is filled in a first space (a gap S1) formed between the plate member and the upper surface of the cell-stacked body and in a second space (gap S2) formed between the side plate and the side surface of the cell-stacked body.

According to (1), the plate member covering at least a part of the surface of the cell-stacked body is provided, and the filler is filled in the first space that is a gap between the plate member and the upper surface of the cell-stacked body and the second space that is a gap between the side plate and the side surface of the cell-stacked body, and thus, movement of the cell-stacked body in an up-down direction and a left-right direction may be restrained. Further, the filler, not a spring member, is used to perform a fixing operation, and thus, increase in manufacturing costs may be prevented and a height dimension of the battery module may be reduced. Also, assembly may be performed easier as compared with the fixing operation by using the spring member.

(2) The battery module according to (1), wherein the plate member includes an injection hole (injection hole 73) through which the filler is injected, and the injection hole is arranged at a location overlapping with the upper surface of the cell-stacked body.

According to (2), filling of the filler in the first space may be performed easily.

(3) The battery module according to (2), wherein a guide passage member (a guide passage member 9 or 9A) is provided between the plate member and the upper surface of the cell-stacked body to guide the filler injected through the injection hole to the second space in an obliquely downward direction.

According to (3), filling of the filler in the second space may be performed easily.

(4) The battery module according to (2) or (3), wherein the guide passage member is movable in an up-down direction with respect to the plate member.

According to (4), the guide passage member is movable in the up-down direction with respect to the plate member, and height variation among the cells may be absorbed.

(5) The battery module according to one of (1) to (4), wherein a bus bar plate (a bus bar plate 23) for holding a plurality of bus bars (bus bars 22) is provided on the upper surface of the cell-stacked body, and the guide passage member is a part of the bus bar plate.

According to (5), the bus bar plate for holding the plurality of bus bars also functions as the guide passage member, and thus, the number of components may be reduced.

(6) The battery module according to one of (1) to (4), wherein a terminal insulation plate (a terminal insulation plate 215A) for insulating a terminal (an external terminal 214) of the cell-stacked body from the cell case (cell case 211) is provided on the upper surface of the cell-stacked body, and the guide passage member is a part of the terminal insulation plate.

According to (6), the terminal insulation plate for insulating the terminal of the cell-stacked body from the cell case also functions as the guide passage member, and thus, the number of components may be reduced.

(7) The battery module according to one of (1) to (6), wherein the module case includes a cooling mechanism (a water jacket 61).

According to (7), the module case includes the cooling mechanism and the cell-stacked body is cooled down via the filler, and thus, cooling efficiency of the cell-stacked body may be improved.

(8) The battery module according to one of (1) to (7), wherein the second space is widened from a lower surface of the cell-stacked body towards the upper surface of the cell-stacked body.

According to (8), the second space makes the cell-stacked body be assembled easily, and is widened from the lower surface of the cell-stacked body towards the upper surface of the cell-stacked body. Thus, the filler may be appropriately filled.

The foregoing description of the exemplary embodiments of the present disclosure has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A battery module comprising:
a cell-stacked body in which a plurality of battery cells are stacked; and
a module case for holding the cell-stacked body, wherein the module case includes
a pair of side plates for holding side surfaces of the cell-stacked body,
a bottom plate on which the cell-stacked body is loaded, and
a plate member installed on an upper end portion of the pair of side plates to cover at least a part of an upper surface of the cell-stacked body,
a filler is filled in a first space formed between the plate member and the upper surface of the cell-stacked body and in a second space formed between the side plate and the side surface of the cell-stacked body,
the plate member includes an injection hole through which the filler is injected,
the injection hole is arranged at a location overlapping with the upper surface of the cell-stacked body,
a guide passage member is provided between the plate member and the upper surface of the cell-stacked body, the guide passage member guiding the filler injected through the injection hole to the second space in an obliquely downward direction, and
the guide passage member includes an inclined guide that guides the filler injected through the injection hole to flow over a surface of the inclined guide, in the obliquely downward direction, and into the second space.

2. The battery module of claim 1, wherein
the guide passage member is movable in an up-down direction with respect to the plate member.

3. The battery module of claim 1, wherein
a bus bar plate for holding a plurality of bus bars is provided on the upper surface of the cell-stacked body, and
the guide passage member is a part of the bus bar plate.

4. The battery module of claim 1, wherein
a terminal insulation plate for insulating a terminal of the cell-stacked body from a cell case is provided on the upper surface of the cell-stacked body, and
the guide passage member is a part of the terminal insulation plate.

5. The battery module according to claim 1, wherein
the module case includes a cooling mechanism.

6. The battery module according to claim 1, wherein
the second space is widened from a lower surface of the cell-stacked body towards the upper surface of the cell-stacked body.

* * * * *